Aug. 10, 1965   M. J. HUNTER   3,199,127
AMPHIBIOUS VEHICLE
Filed Jan. 31, 1963   3 Sheets-Sheet 1
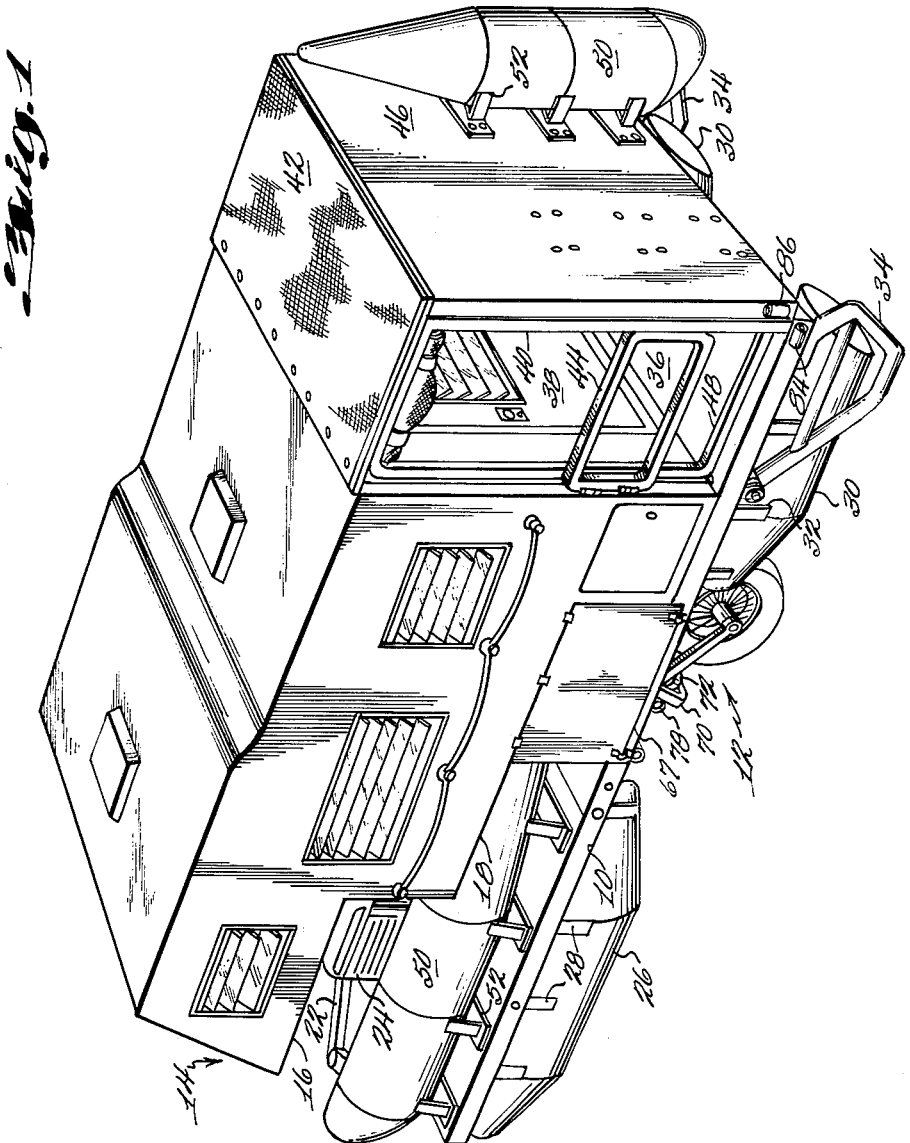
INVENTOR.
MILFORD J. HUNTER
BY
Cushman, Darby & Cushman
ATTORNEYS

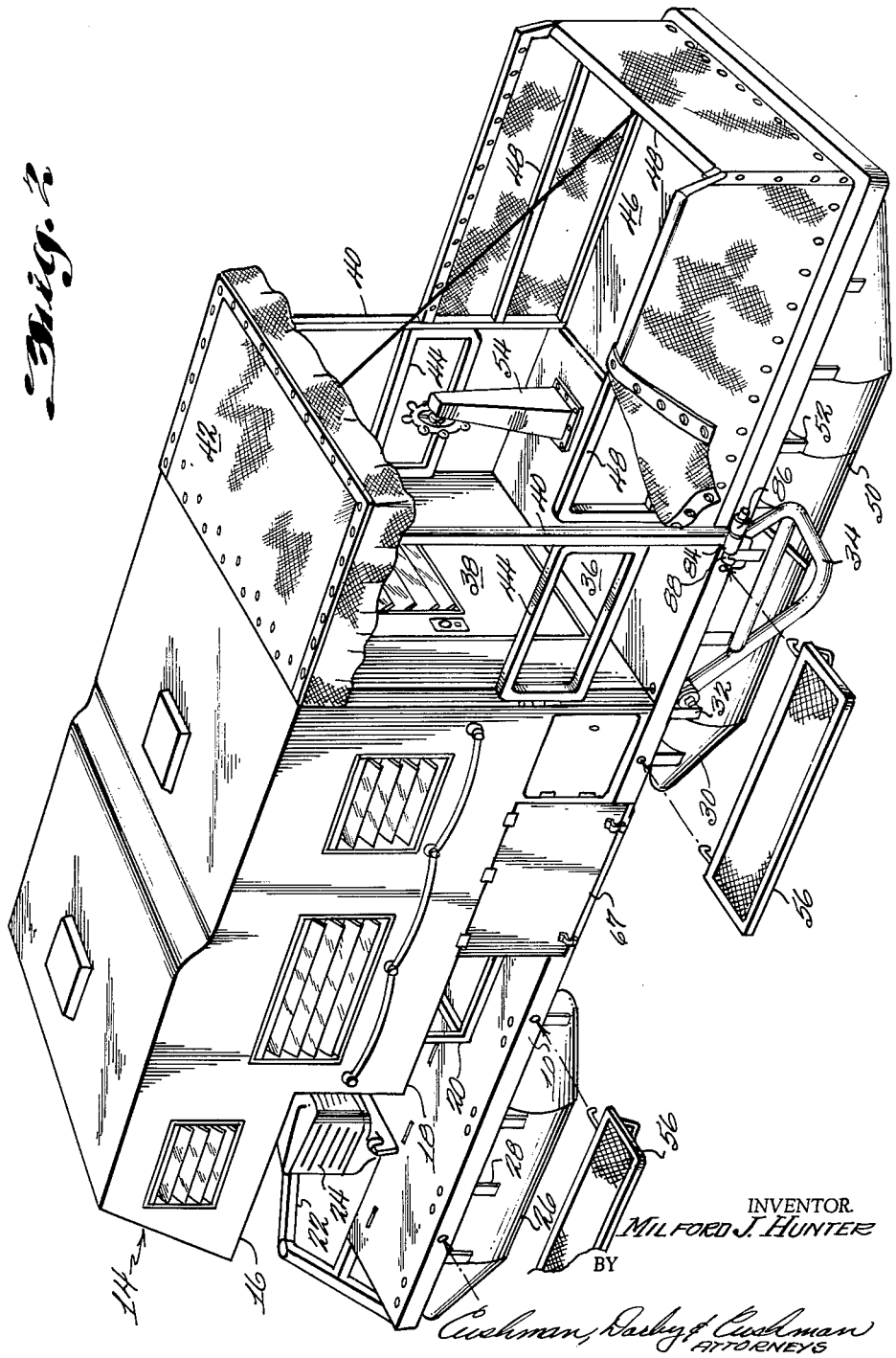

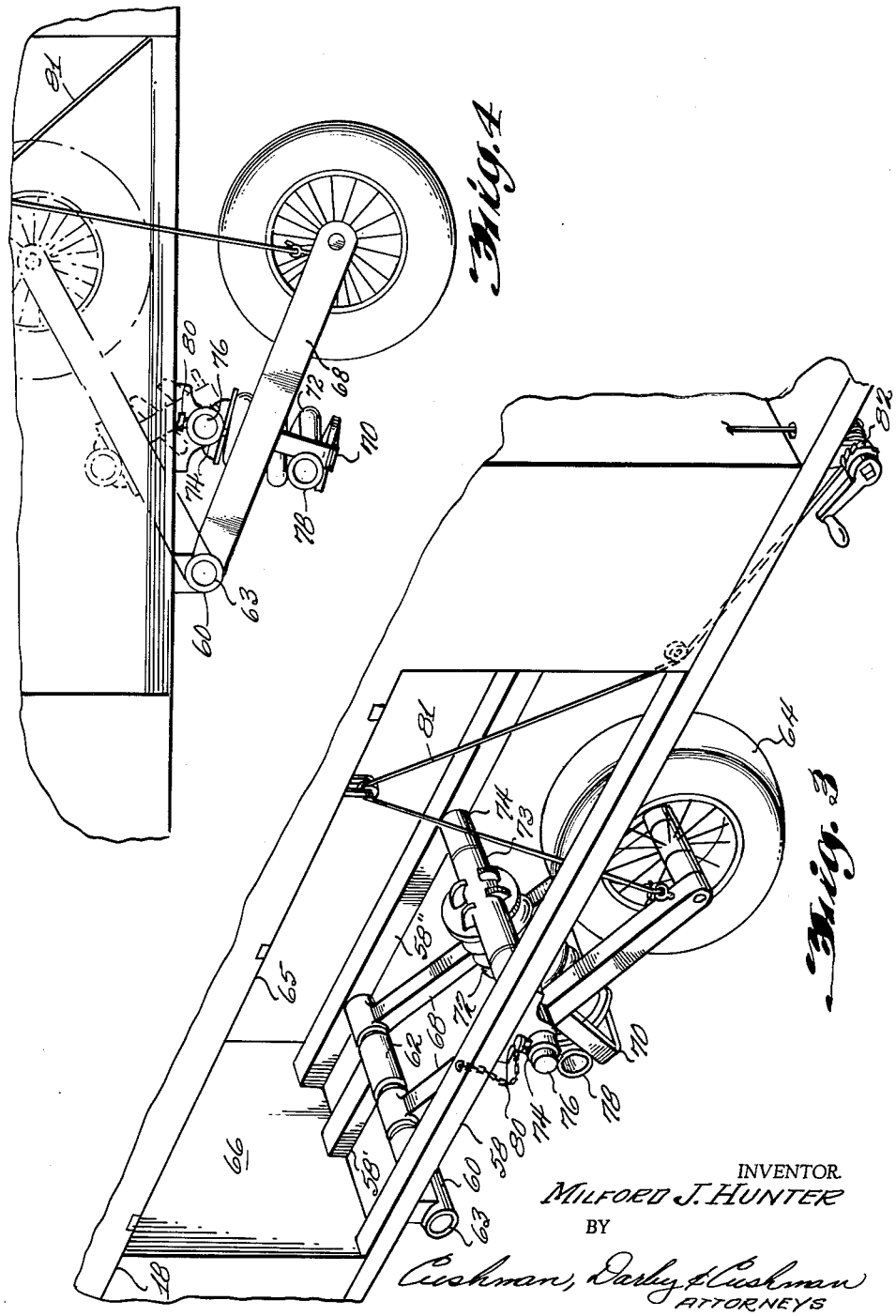

United States Patent Office 3,199,127
Patented Aug. 10, 1965

3,199,127
AMPHIBIOUS VEHICLE
Milford J. Hunter, 164 Hicks St., Brooklyn 1, N.Y.
Filed Jan. 31, 1963, Ser. No. 255,273
3 Claims. (Cl. 9—1)

This invention relates to an amphibious vehicle and more particularly to an improved arrangement for converting such a vehicle between land and water operation.

As more and more people have taken to the outdoors, the development of equipment for camping, boating, etc., has been rapid. In particular, the fabrication of compact outdoor living quarters has been an extremely active field. There have been an increasing number of living units developed which may be easily transported. In particular, the so-called "traveler" unit has become very popular. This is a unit which is designed to be set in the flat bed of pickup or larger size truck bodies, to thereby form a combination which may negotiate rough and narrow roads inaccessible to most house trailers. Frequently owners of these travelers transport boats with them by attaching boat trailers thereto or by tying the boat on top of the traveler. It is to satisfy those who wish to combine boating and camping that this invention is particularly directed.

The principal object of the invention is to provide an amphibious vehicle, including as a portion thereof a traveler type living unit, which is readily convertible between land and water operation.

More particularly, it is an object of this invention to provide an amphibious trailer bed for integrally or detachably carrying such a traveler unit, wherein the trailer is designed with an improved convertible wheel assembly arrangement.

A further object is to provide a spacious floating unit which may be folded to achieve a compact arrangement for trailing over land without the requirement of special permits necessary for larger and heavier vehicles.

These and other objects of the invention will become more apparent when taken in conjunction with the following drawings of an illustrative embodiment of the subject device and from the appended claims. The illustrative embodiment may be understood by reference to the accompanying drawings, wherein:

FIGURE 1 is a view in perspective of an amphibious vehicle embodying this invention in its trailing condition, except for the pontoon section attached to the rear thereof;

FIGURE 2 is a view corresponding to FIGURE 1 but showing the vehicle in its floating condition, the catwalks being separated from the vehicle for the purpose of clarification;

FIGURE 3 is a detailed view in perspective of the wheel assembly of the embodiment of FIGURE 1 in the trailing position. The side panel has been removed to clearly illustrate the assembly structure;

FIGURE 4 is a detailed side elevation view illustrating the structure of FIGURE 3. The chain lines indicate the position of the wheel assembly when retracted for on-water operation.

Basically, the vehicle comprises a trailer bed having a foldable end member. Mounted beneath the main portion of the trailer bed are fixed pontoons and retractable wheel assemblies. On the bed there is mounted a traveler living unit. In its trailing position the end member folds against the traveler. However, for on water operation, portable floats are attached to the bottom of this end section. The section is lowered and locked to the main trailer bed to form an extension thereof. The wheel assemblies are locked in retracted and extended positions during water and land operation respectively.

Referring to the drawings the invention may be described in detail. FIGURE 1 illustrates the device in its trailing position. The amphibious vehicle comprises a main support platform 10 to which is attached on opposite sides thereof a retractable wheel assembly 12 to be hereinafter described in detail with reference to FIGURES 3 and 4. In the trailing position, the wheel assemblies are locked in their operative position as shown in FIGURE 1. Mounted on the support platform 10 is a living unit showing generally at 14. This unit is provided with a stepped front configuration comprising recesses 16 and 18 on the underside of the traveler. The forward portion of the traveler is supported on platform 10 by a suitable support arrangement 20 (FIGURE 2). Attached to the front end of the support platform 10 is a conventional trailer hitch drawbar assembly 22. A portion of the front section of platform 10 is recessed to allow an outboard motor 24 to be attached to the platform. Beneath the support platform there is provided at the front end and on opposite sides thereof, a pair of pontoons 26. These pontoons may be of any suitable material, but are preferably made of aluminum, and they are attached to the underside of the platform by clamps 28. To the rear of the platform there is mounted on the underside thereof a pair of pontoon sections 30 attached to opposite sides of the platforms by clamps 32. Also connected to the support platform adjacent and outside of the pontoon sections are drag bumpers 34 to protect the pontoons from damage caused by road obstacles when trailing or underwater obstacles while the vehicle is in the water. These drag bumpers also serve as ladders facilitating access to a deck area 36 of the supporting platform to the rear of the living unit 14. From this deck area 36, entry to the living unit may be achieved through a door 38 at the rear of the unit. A pair of vertical columns 40, shown more clearly in FIGURE 2, are provided at the rear of the supporting platform to serve as support for a canopy 42 over the deck area 36. Between the columns 40 and the rear of the living unit there are provided gates 44 hinged on the columns to swing inwardly such that the gates also serve as railings. Hinged to the rear of the support platform 10 is a sun deck 46. Each of the edges of the sun deck, with the exception of that which is hinged, is provided with a railing structure 48 which may be covered, if desired, by a suitable material.

In the trailing position, as shown in FIGURE 1, the sun deck is folded upwardly by suitable cable and pulley means to telescope the railings within area 36 and canopy 42 thereby enclosing this area. A pair of pontoon sections 50 may be stored during trailing on the support platform 10 within the areas defined by the recesses 16 and 18 of the living unit 14. Clamps 52 are fixed to these pontoon sections and are removably attached to the platform 10 by any suitable means such as bolts, lock pins, or other binding devices. When it is desired to ready the vehicle for use on the water, the pontoon sections 50 are removed from the storage areas and are attached to the bottom of the sun deck 46. One such attachment of a pontoon section 50 is illustrated in FIGURE 1.

FIGURE 2 illustrates the amphibious vehicle as it appears in operation on the water. In this position the sun deck 46, having both pontoon sections 50 attached to its bottom, is unfolded to bring it to a position whereby it forms an extension of the support platform section 36. It should be noted that in this position, pontoon sections 50 abut sections 30 to form a complete floatation unit for the portion of the vehicle which comprises the gear end when in the trailing configuration but which becomes the bow of the device when in its floating position. A portable helm 54 is attached to the deck area 36 to provide a steering mechanism for the vehicle. A plurality of individual portable catwalks 56 may be installed along the sides of the vehicle as illustrated in order to provide access between the bow and the stern, and to the wheel retraction mechanisms during operation on the water.

The structure of the wheel assemblies 12 may be described with reference to FIGURES 3 and 4. The main support platform includes a plurality of longitudinally extending, spaced strengthening members 58, 58', etc., as shown in FIGURE 3. To the two outermost strengthening members 58 and 58' on each side of the vehicle are connected transverse wheel support devices 60 and 62, respectively. These devices, comprising a pair of axially aligned, spaced tubular members, are associated with a bar 63 extending therethrough and with further wheel supporting apparatus, to be hereinafter described, to allow the wheels 64 of the vehicle to be retracted within, and extended from, wheel-wells 65 comprising recesses in the sides of the traveler unit rearwardly of the front recess 18 as shown. These wheel wells are normally hidden by front panels 66 and removable side panels 67 (FIGURES 1 and 2).

Considering now only a single wheel assembly, there is pivotally mounted to the wheel support bar a pair of substantially parallel, spaced wheel-carrying arms 68. A wheel 64 is journalled between the free ends of these arms. Between arms 68, at points substantially centrally located thereon, there is connected a U-shaped member 70. To the web of member 70 is mounted one end of a coil spring 72. The other end of the coil spring supports a tubular member 73, and the axis of which extends in a direction normal to the axis of the coil. With the wheel assembly fully extended, tubular member 73 is aligned with, and interposed between, a pair of spaced tubular locking devices 74, mounted on strengthening members 58 and 58', respectively, in parallel spaced relationship to wheel support devices 60 and 62 to receive a removable locking bar 76. To the lower end of the U-shaped member 70 adjacent the coil spring there is also connected a second tubular member 78. The axes of members 73 and 78 are equidistant from the axis of rotation of the wheel assembly 12 so that when the assembly is fully retracted, member 78 is axially aligned with the locking devices 74 to receive the locking bar 76. To firmly hold the removable locking bar 76 in its operative position, a locking pin 80 with a spring clip is employed to extend through aligned holes in the outer locking device 74 and the locking bar 76. This pin is attached to the outer strengthening member 58 by a chain, as shown. To retract and extend the wheel assembly, a cable 81, connected to the free end of one of the arms 68, is passed over an appropriate arrangement of pulleys to a ratcheted hand winch 82.

With the structure of the vehicle fully set forth, the launching procedure will be described. The amphibious vehicle and the towing vehicle are first parked and the portable pontoons 50 are dismounted from their stored positions within recesses 16 and 18 adjacent the motor 24 and are connected by clamps 52 and suitable binding devices to the underside of the sun deck 46. The amphibious vehicle is then backed into the water causing the wheels to begin to lift off the bottom due to the buoyancy effect of the pontoons 26 and 30. The sun deck 46 is lowered by means of a hand winch until its floats support it. However, since the trailer hitch drawbar 22 is still connected to the towing vehicle, the sun deck and the main support platform do not float as high on the water as in their independent state. Catwalk sections 54 may be attached to the sides of the main support platform 10 in order to provide access to the wheel assemblies 12. Under these conditions the wheel assemblies are locked in their trailing position, locking bars 76 extending through the respective locking devices 74 and tubular members 73. To retract the wheels 64, the locking pins 80 are removed and the locking bars 76 are withdrawn. The ratcheted winches 82 are then cranked to draw the wheels up within their respective wheel-wells 66. When tubular members 78 are coaxial with locking devices 74, the locking bars and pins are inserted. In this position the wheel assemblies will drain and dry quickly and will be safely out of the water thus being protected from corrosion and damage which might be caused by engagement with docks and other obstacles. When the amphibious vehicle is released from the towing vehicle, it rises in the water to its normal floating position. At this time the sun deck may be locked in place. This may be accomplished in several ways. In the illustrative embodiment shown, a pair of tubular devices 84 and 86 are mounted respectively on the main support platform 10 and the sun deck 46 on opposite sides thereof. When the sun deck is in its normal on-water position, the tubular devices on each side of the vehicle are aligned. Lock pins 88 are then inserted to lock the sun deck in its floating position. To complete the arrangement, the helm 54 may be installed and appropriate control cables attached to the outboard motor 24 which is lowered to its operative position. Various accessories such as sun canopies may be attached to the structure to outfit it for extensive use on the water. When it is desired to remove the vehicle from the water, the above-described procedure is reversed.

The amphibious vehicle disclosed herein is an example of an arrangement in which the inventive features of this disclosure may be utilized, and it will become apparent to one skilled in the art that certain modifications may be made within the spirit of the claimed invention. For example, the operation of the wheel assemblies and the sun deck may be accomplished simultaneously by employing a unitary compound winch arrangement.

What is claimed is:

1. An amphibious vehicle comprising a main support platform, an enclosed living unit supported on said platform, a foldable member hinged to one end of said platform along the edge thereof, the hinged edge of the platform being spaced from said living unit to define a deck area on said main support platform, means for retracting said foldable member from a position co-extensive with said deck area to a substantially vertical position whereby said deck area is enclosed along one side thereof, fixed pontoon devices mounted beneath said main support platform, removable pontoon sections selectively attachable to one surface of said foldable member, retractable wheel assembly means mounted on said main support platform, a drawbar assembly at the opposite end of said main support platform from said foldable member, means for mounting an outboard motor on said support platform adjacent said drawbar assembly, portable catwalks for selective mounting along the sides of said platform, bumper means mounted beneath said platform and extending to a level below that of the pontoon devices, and a helm for steering said vehicle mounted on said deck area.

2. An amphibious vehicle comprising a main support platform, an enclosed living unit supported on said platform, a foldable member hinged to one end of said platform along the edge thereof, the hinged edge of the platform being spaced from said living unit to define a deck area on said main support platform, means for retracting said foldable member from a position co-extensive with said deck area to a substantially vertical position whereby said deck area is enclosed along one side thereof, floatation means mounted to the underside of said platform and retractable wheel assembly means connected to said platform; said retractable wheel assembly means comprising a wheel support arrangement pivotally mounted on said platform, a locking arrangement associated with said wheel support arrangement for selectively locking said wheel assembly in one of two positions; said locking arrangement including spaced, axially aligned elements fixed to said main support platform along an axis transverse thereto, a pair of locking members mounted on said wheel support arrangement, said members being selectively positioned in axial alignment with said fixed elements, a locking bar engageable with said fixed elements and a locking member aligned therewith to lock said wheel assembly in a selected one of two positions; and means for pivotally moving said wheel support arrangement for selectively positioning one of the pair of said locking members in alignment with said fixed elements.

3. An amphibious vehicle as set forth in claim 2 wherein said wheel support arrangement includes a pair of substantially parallel arms pivotally connected to said main support platform, a wheel journalled between the free ends of said arms, a generally U-shaped member extending between said arms and having opposite legs connected thereto, a coil spring having one end fixed to said U-shaped member, the first of said pair of locking members being connected to the opposite end of said coil spring, and the second locking member being connected to said U-shaped member adjacent the fixed end of said coil spring such that each of said pair of locking members is equidistant from the axis of rotation of said arms.

References Cited by the Examiner
UNITED STATES PATENTS

| | | | |
|---|---|---|---|
| 2,518,602 | 8/50 | Crook | 9—1 |
| 2,650,834 | 9/53 | Coval | 280—43 |
| 2,727,484 | 12/55 | White | 9—1 |
| 2,781,529 | 2/57 | Moody | 9—1 |
| 3,042,942 | 7/62 | Howe | 9—1 |
| 3,079,616 | 3/63 | Byberg | 9—1 |

FERGUS S. MIDDLETON, *Primary Examiner.*